United States Patent [19]
Andren

[11] 3,973,201
[45] Aug. 3, 1976

[54] PSK MODULATOR WITH REDUCED SPECTRUM OCCUPANCY

[75] Inventor: Carl F. Andren, St. Petersburg, Fla.
[73] Assignee: NCR Corporation, Dayton, Ohio
[22] Filed: Aug. 16, 1974
[21] Appl. No.: 497,979

[52] U.S. Cl. .............................. 325/163; 178/66 A; 325/147; 332/23 R
[51] Int. Cl.² ....................................... H04B 1/04
[58] Field of Search ............ 332/16 R, 23 R, 23 A, 332/18, 22, 24, 16 T, 19–20; 325/161, 163, 30, 145–148, 126, 139, 320, 60, 61, 40, 47; 178/67, 68, 66 R, 66 A

[56] References Cited
UNITED STATES PATENTS

| | | | |
|---|---|---|---|
| 2,238,249 | 4/1941 | Crosby | 325/147 X |
| 3,123,670 | 3/1964 | Kaenel | 178/67 |
| 3,755,739 | 8/1973 | Okano | 325/163 |

Primary Examiner—Robert L. Griffin
Assistant Examiner—Robert Hearn
Attorney, Agent, or Firm—J. T. Cavender; Albert L. Sessler, Jr.; Edward Dugas

[57] ABSTRACT

A premodulation filter is used to slow the transitions of a digital data signal to reduce spectrum occupancy. Carrier signal generator means provides in-phase and quadrature-phase carrier signals. A first modulation means receives the in-phase carrier signal for modulation by the filtered digital data signal. A second modulation means receives the quadrature-phase carrier signal and a control signal for modulation of the quadrature-phase carrier signal by the control signal. A combining means receives the modulated signals from the first and the second modulation means for providing a combined output signal. An amplitude limiter receives the combined output signal for limiting the amplitude variations in the combined signal. A circuit means receives the filtered digital data signal, and provides the control signal which adjusts the amplitude of the quadrature-phase carrier signal to complement the amplitude of the modulated in-phase carrier signal.

10 Claims, 17 Drawing Figures

3,973,201

PSK MODULATOR WITH REDUCED SPECTRUM OCCUPANCY

BACKGROUND OF THE INVENTION

This invention relates to the field of RF modulators and more specifically to phase-shift-keyed (PSK) modulators.

Phase-shift-keyed digital data transmitters of the type which utilize a premodulation filter for reducing sideband splatter have a problem which is introduced because of the use of the premodulation filter. The problem is that during data transitions the amplitude of the RF carrier will decrease to zero as the phase of the carrier changes from positive to negative and back from negative to positive. This change in carrier amplitude when operated upon by a highly nonlinear class "C" power amplifier, of the type used in RF transmitters, creates amplitude holes in the modulated output carrier. These holes contribute to sideband splatter, which splatter negates the advantages of using a premodulation filter. A phase vector rotation, between positive and negative phases, wherein the amplitude of the phase vector remains substantially constant, would eliminate the amplitude holes and accompanying sideband splatter.

SUMMARY OF THE INVENTION

In a preferred embodiment of the present invention the phase of an RF carrier signal is modulated by a filtered digital data signal in a first modulator. A second modulator receives the RF carrier signal in quadrature (shifted in phase by 90°) for modulation by a control signal which is a function of the filtered digital data signal. A combiner combines the signals from the output of the first and second modulators. A limiter receives the combined signals and limits the amplitude variations of the combined signals. A circuit means responsive to the filtered digital data signal provides the control signal, which is of a minimum amplitude when the modulated RF carrier signal from the first modulator is of a maximum amplitude and which increases or decreases in amplitude as the modulated RF carrier signal from the first modulator decreases or increases in amplitude, respectively. The output signal from the combiner is thereby held to a substantially constant amplitude even though the amplitude of the RF carrier signal decreases to zero as its phase is changed from positive (0°) to negative (180°).

From the foregoing it can be seen that it is a primary object of this present invention to provide a novel PSK modulator.

It is another object of the present invention to provide a PSK modulator wherein carrier signal amplitude holes are filled.

It is still another object of the present invention to provide a modulator wherein sideband splatter is minimized.

These and other objects of the present invention will become more apparent when taken in conjunction with the following description and drawings throughout which like characters indicate like parts and which drawings form a part of this application.

DESCRIPTION OF THE PREFERRED EMBODIMENT OF THE INVENTION

Figure 1:
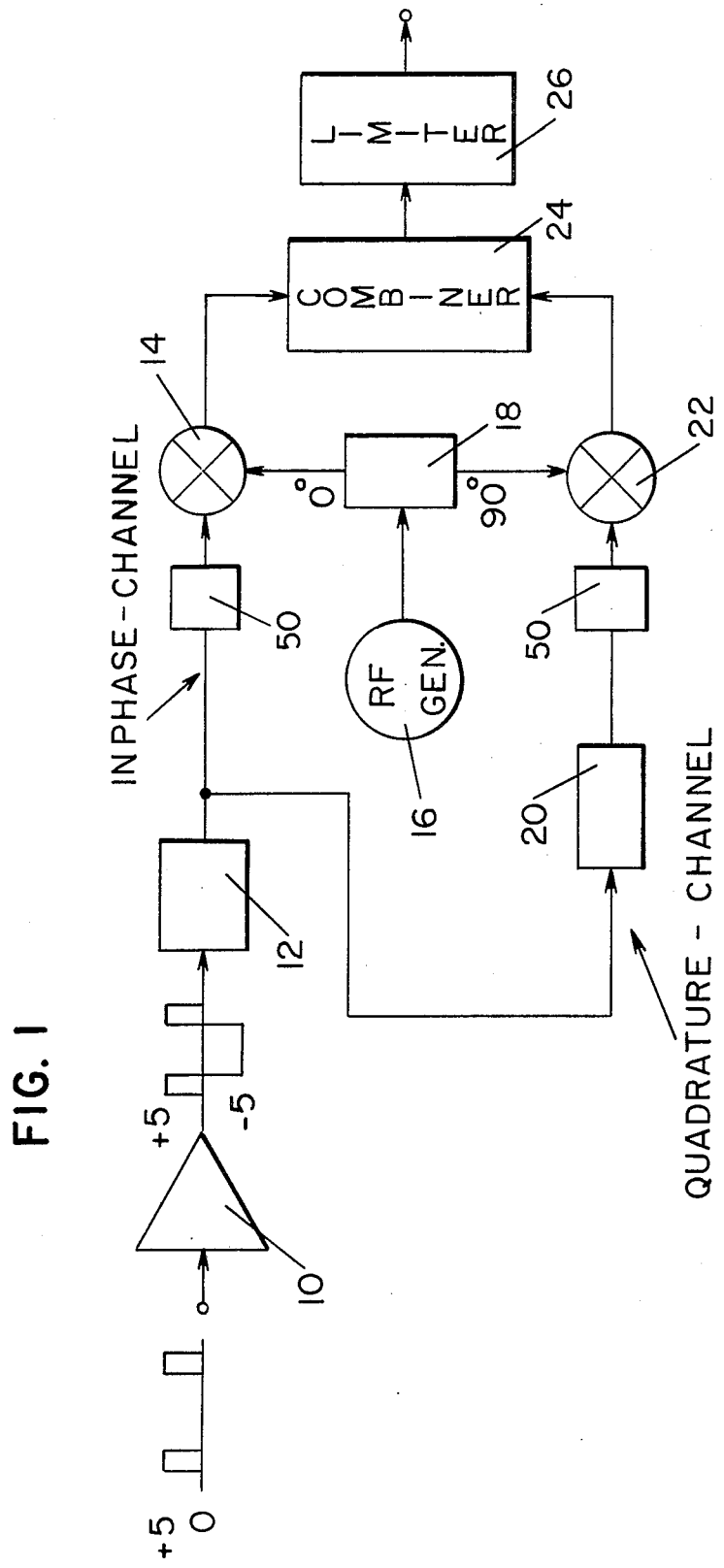
FIG. 1 is a block diagram of the preferred embodiment of the invention.

Referring to FIG. 1, the buffer amplifier 10 receives a train of digital data pulses which data pulses are to be used to phase modulate an RF carrier signal. The digital data pulses encountered in the preferred embodiment have amplitude data levels of 0 and 5 volts. The buffer amplifier 10 changes the data amplitude levels to corresponding pulses of a positive or negative amplitude which pulses are symmetrical about a zero level. The signal from the buffer amplifier is fed to a low pass filter 12. The low pass filter 12 may be a 3-Pole Butterworth active circuit whose corner frequency is chosen to be 0.75 times the bit rate of the digital data input signal. The low pass filter provides spectrum reduction by slowing down the data transitions.

The output of the low pass filter signal is directed along two paths, one of which will be called the inphase channel and the other of which will be called the quadrature-phase channel. The in-phase channel signal is fed to an input port of a phase modulator 14. The phase modulator may be a double-balanced diode mixer which achieves 180° phase inversion of its output signal with a proper drive signal on an input port.

An RF carrier signal generator 16 provides the carrier signal, which signal in the preferred embodiment has a frequency of 300 MHZ. The RF carrier signal is fed to a 90°hybrid circuit 18 which circuit operates to provide a 90° phase shifted RF carrier signal at one of its outputs and a 0° phase shifted RF carrier signal at its other output. The filtered digital data signal fed to modulator 14 modulates the 0° phase RF carrier signal to a 0° phase or a 180° phase depending on whether the filtered data signal is of a positive or of a negative amplitude. The filtered digital data signal is also fed to a quadrature-phase channel control circuit 20, the operation of which will be described in detail in the discussion directed towards FIG. 2. The control circuit 20 functions to create a drive voltage which is fed to the input port of the quadrature channel phase modulator 22.

The drive voltage which is derived from the filtered digital data signal is of a zero amplitude when the amplitude of the phase modulated signal from phase modulator 14 is at a maximum amplitude level, and is at a maximum amplitude when the signal from the phase modulator 14 is at a minimum level. For all amplitude values in-between, the drive voltage amplitude attempts to complement the amplitude of the signal from phase modulator 14 to maintain the combined amplitudes substantially constant. In mathematical terms, the instantaneous value of the signal from the phase modulator 22 equals the maximum value of the signal from the phase modulator 14 minus the absolute value of the instantaneous value of the signal from phase modulator 14. The drive voltage to modulator 22 will therefore be conditioned not to have a negative amplitude.

The modulated output signals from the phase modulators 14 and 22 are combined in the RF combiner 24. The combined signals are then fed to an RF limiter 26. The RF limiter functions to remove small amplitude modulations which appear in the combined signals.

Figure 2:
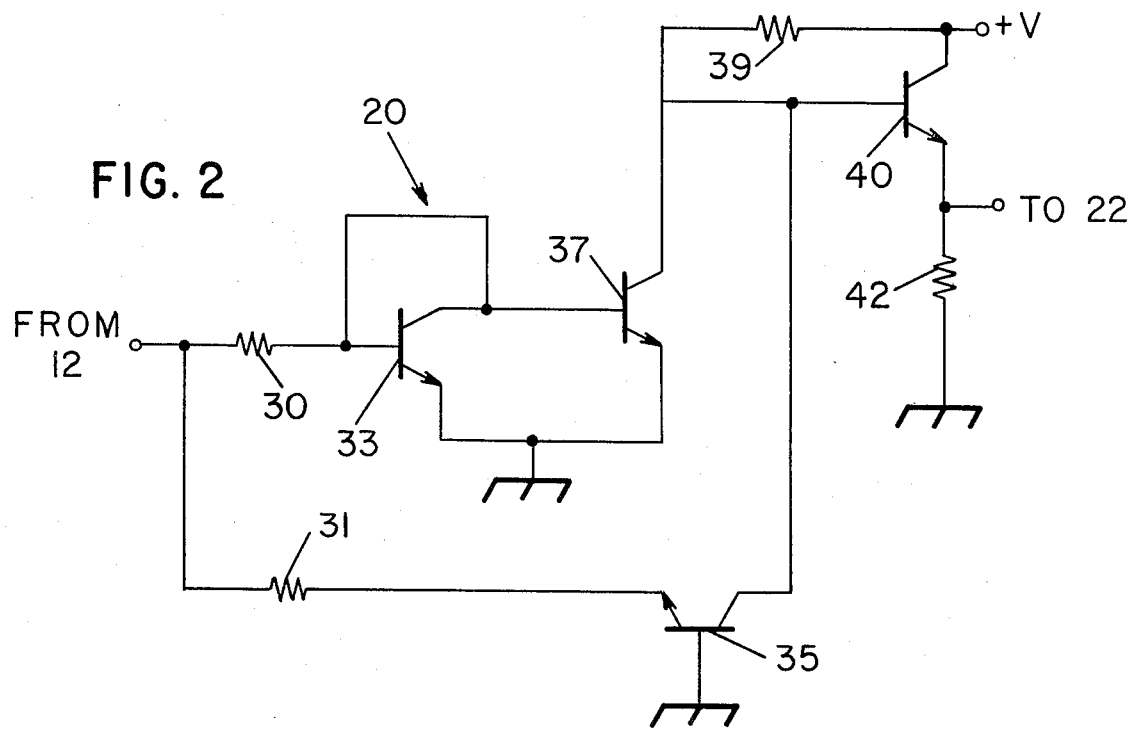
FIG. 2 is a schematic diagram of one of the blocks shown in FIG. 1.

Referring to FIG. 2, channel controller circuit 20 receives the filtered data input signal from the low pass filter 12 along two paths. One path consists of resistor 30, NPN transistor 33, NPN transistor 37, and resistor 39. The other path consists of resistor 31, NPN transistor 35 and resistor 39. Within the first path, resistor 30 connects the base of transistor 33 to the filtered data signal from the low pass filter 12. The collector of transistor 33 is connected to the base of transistor 37 and back to its own base. The emitters of transistor 33 and 37 are connected to a reference potential such as ground. The collector of transistor 37 is connected by means of resistor 39 to the positive potential source, +v. Along the second signal path the resistor 31 connects the emitter of transistor 35 to the filtered data signal. The base of transistor 35 is connected to the reference potential (ground). The collector of transistor 35 is connected to the base of transistor 40 and to the collector of transistor 37. Transistor 40, which is the output transistor, has its collector connected to the +v potential source and its emitter connected to the reference potential by means of a resistor 42. The output of the controller circuit 20 is taken from the emitter of transistor 40. In operation the filtered data signal is derived from a low impedance source, that is a voltage source, so that the current through resistor 30 is proportional to the input voltage passed through a resistor (resistor 30) and a diode (base-emitter junction of transistor 33) connected to ground. The specific connection of transistors 33 and 37 is known in the art as a current mirror: that is as the input current through the base-emitter junction of transistor 33 sets up a base-emitter voltage, that voltage is applied in turn to the base-emitter junction of transistor 37. Transistors 33 and 37 are selected to be as identical as possible. Since both transistors have the same base-emitter potential and are otherwise identical, the collector current of transistor 37 must be equal to the collector current of transistor 33 which in turn is equal to the base current of transistor 33. This magnitude of current also flows through the collector resistor 39. When the filtered data input signal is of a maximum positive amplitude, that is, for the present embodiment 5 volts, the collector voltage of transistor 37 will be approximately 0 volts. The output voltage from transistor 40 taken from the emitter to ground is, therefore, also approximately 0 volts. When the filtered data input signal is 0 volts, the current through the base of transistor 33 is zero. Therefore, the current in transistor 37 will be zero, and the collector voltage of transistor 37 will be approximately +5 volts. When the filtered data input signal is between 0 and +5 volts the output voltage at the emitter of transistor 40 will vary linearly to the input voltage (filtered data input signal), but inverted in sense and referenced to the positive 5 volt source. For negative input voltages, transistors 33 and 37 will be cut off; and transistor 35 will control the output voltage. When the filtered data input signal goes negative, current will flow through resistor 39, transistor 35 and resistor 31. The emitter of transistor 35 cannot be at a potential greater than one diode drop below ground. The current in transistor 35 will thus be proportional to the input voltage passed through a resistor equal in value to resistor 31 and a diode (base-emitter junction) connected to ground. The current in resistor 31 will be the collector current of transistor 35. This current will pass through resistor 39 causing the base of transistor 40 to have a potential approaching the reference potential, or ground. The emitter of transistor 40 will therefore be approximately 0 voltage. When the filtered data input signal is 0 in amplitude, transistors 35, 33 and 37 will all be cut off and the output voltage will be at its maximum value of +5 volts.

Figure 3:
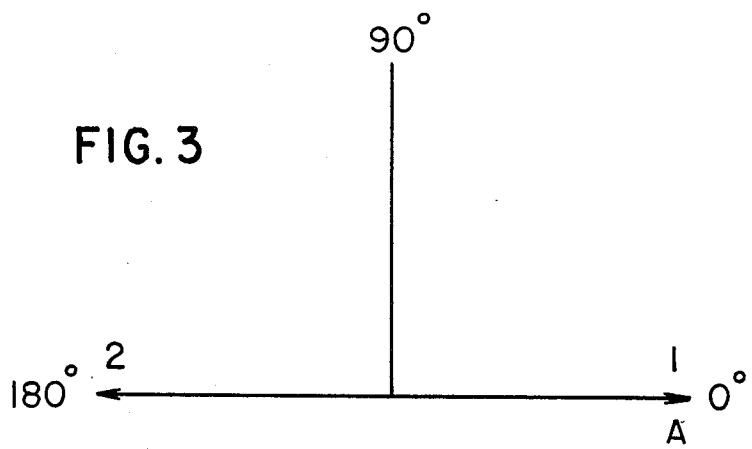
FIG. 3 illustrates a conventional phase locus.

Referring to FIG. 3, a conventional phase locus is shown having an amplitude vector A which passes through a zero amplitude condition when changing from a positive phase (position 1) to a negative phase (position 2). This passing through zero is what creates amplitude holes in the modulated carrier.

Figure 4:
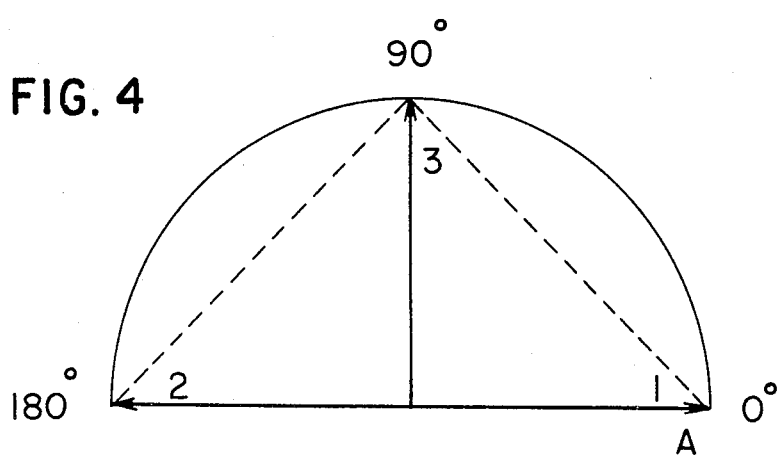
FIG. 4 illustrates the phase locus of the embodiment of FIG. 1.

In FIG. 4, the phase locus for the present system taken at the output of the RF combiner is shown in dotted lines wherein the amplitude vector traverses a chord path from position 1 to position 3, and from position 3 to position 2. From this Figure it can readily be seen that the amplitude contribution of the quadrature-phase channel is at a maximum value when the phase of the in-phase channel signal is passing through the +90° phase. The straight line chord path of the amplitude vector implies a 3db drop in carrier power during the transition from position 1 to position 3 and again in the transition from position 3 to position 2. The limiter amplifier 26 placed to receive the output signal from the RF combiner eliminates this amplitude drop and consequently causes the phase vector to rotate through a perfect half-circle as evidenced by the solid line of FIG. 4.

In order to operate at highest efficiency the phase modulators 14 and 22 must be linearized. Conventional double-balanced diode mixers tend to be very non-linear. Therefore a linearizing circuit of proper design can be used to achieve the proper degree of linearization, but is not essential to the operation of the invention.

Figure 5:
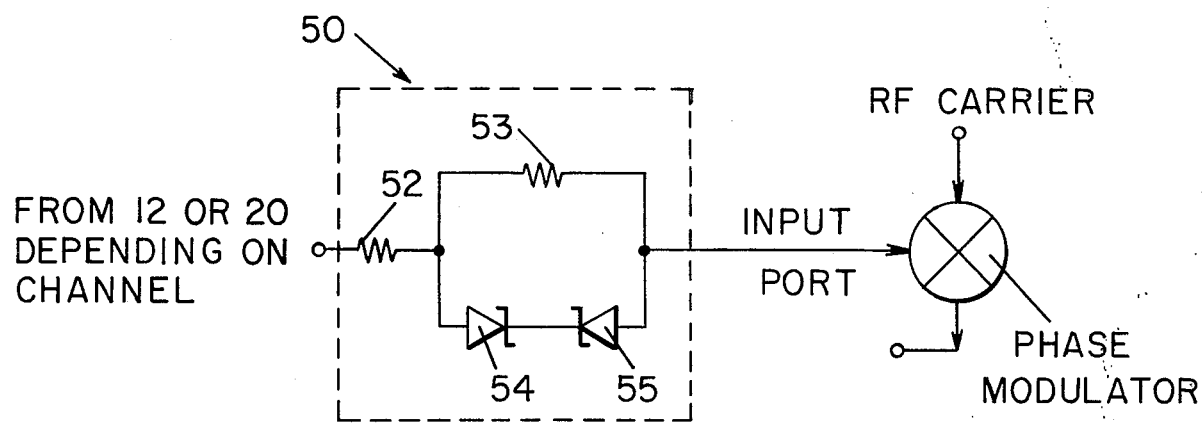
FIG. 5 illustrates a linearizer which may be used in the embodiment of FIG. 1.

A linearizing circuit 50 of the type shown in FIG. 5 can be inserted just before the input port of each of the phase modulators. The linearizer 50 is comprised of a resistor 52 connected in series with a parallel combination of a resistor 53 and back-to-back connected pairs of zener diodes 54, 55. The values of the resistors and zener diodes are determined by the voltage current characteristics of the phase modulator compared against the desired linear characteristics. The difference between the actual phase modulator voltage circuit characteristics and the desired characteristics will result in a non-linear characteristic. The linearization circuit is then designed to have this non-linear characteristic. When the non-linear characteristics of the phase modulator are combined with the non-linear characteristics of the linearization circuit the two characteristics complement each other to form a linear characteristic.

The linearization circuit of FIG. 5 operates well at relatively low data rates but for high data rates the junction capacitance of the zener diodes becomes excessive and linearization circuits characteristics change.

Figure 6:
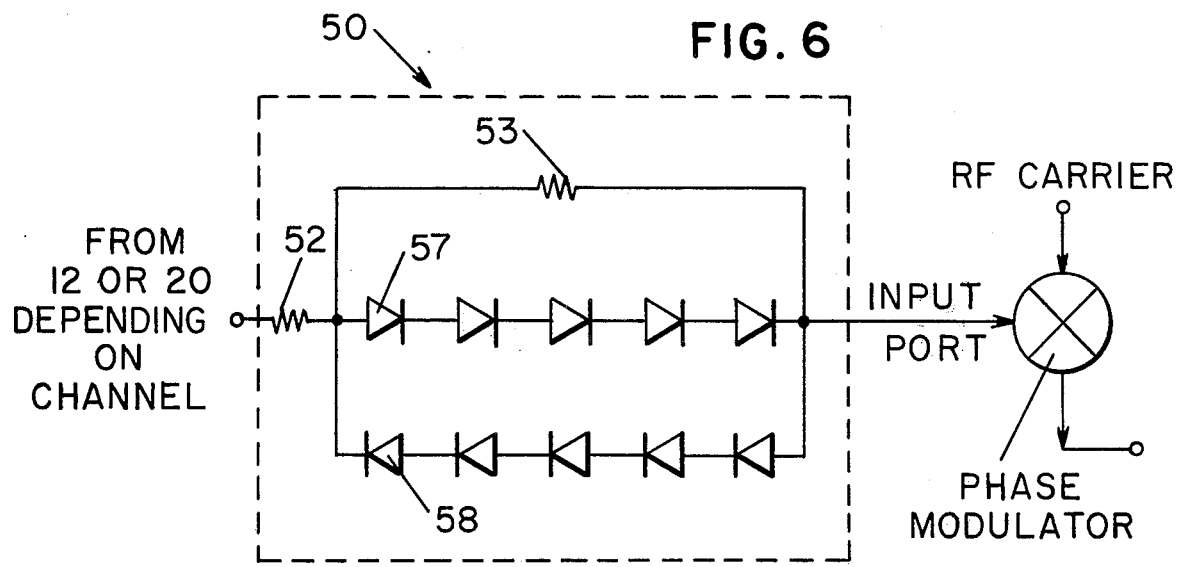
FIG. 6 illustrates another linearizer which may be used in the embodiment of FIG. 1.

The linearization circuit 50 of FIG. 6 eliminates the excessive junction capacitance problem by substituting two series strings of general purpose diodes 57 and 58 connected in parallel in place of the zener diodes.

Figure 7:
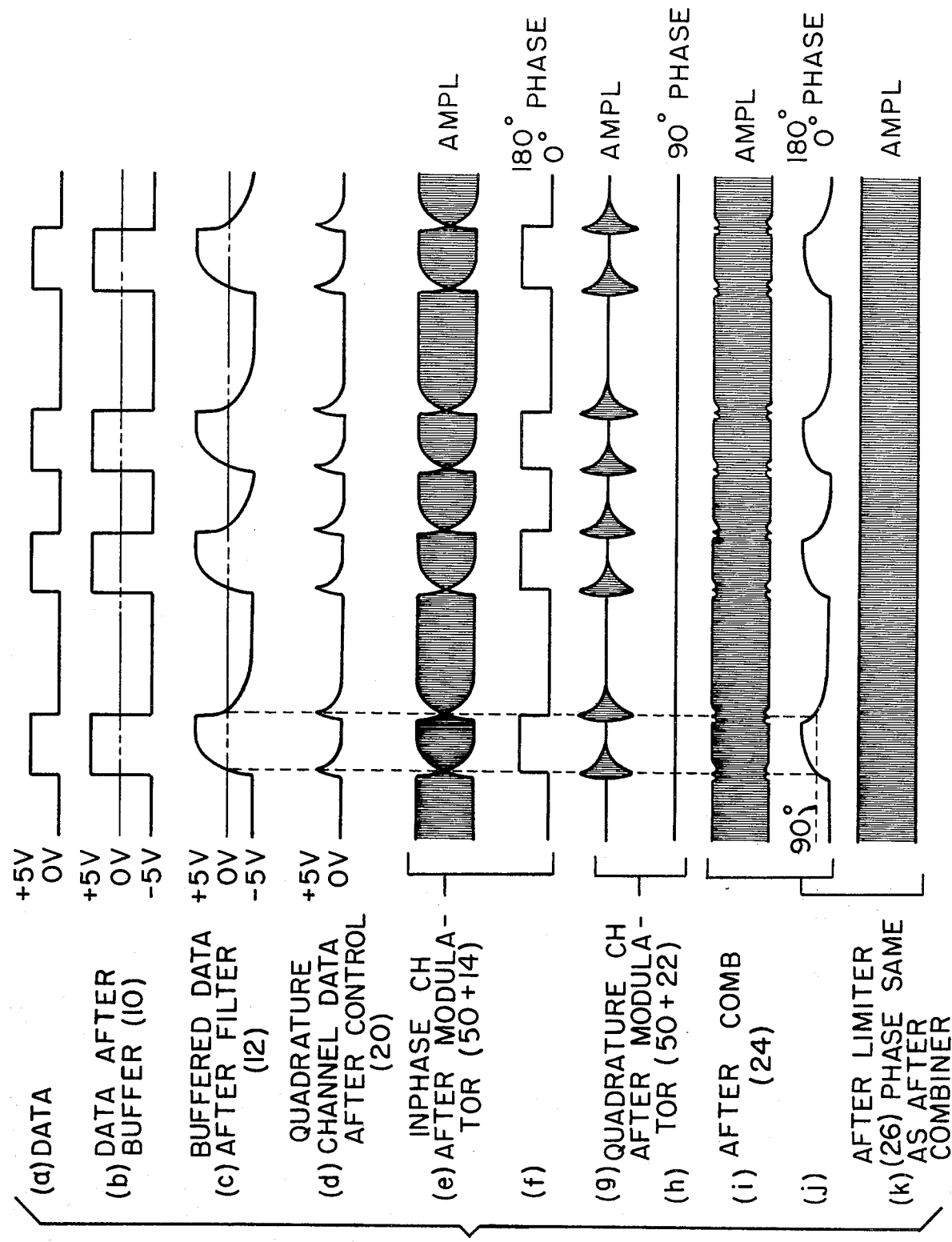
FIG. 7 (a) to 7(k) illustrate waveforms taken at strategic locations in the preferred embodiment shown in FIG. 1.

FIG. 7(a) illustrates the data signal present at the input of the amplifier 10. The signal varies between a low state level of 0 volts and a high state level of +5 volts. The output signal from the amplifier 10 is shown in FIG. 7 (b) as a signal corresponding in state levels to the data signal of FIG. 7(a), but having state levels which are symmetrical around the 0 volt level, that is, to amplitude levels of +5 volts. FIG. 7(c) shows the waveform of FIG. 7(b) after it is filtered by the filter 12. The waveform of FIG. 7(c) is applied to the linearization circuit 50 and to the control circuit 20. FIG. 7(d) illustrates the waveform present at the output of the quadrature-phase channel control circuit 20. The waveform of FIG. 7(d) is that portion of the waveform of FIG. 7(c) which goes below 0 volts moved up by +5 volts and that portion of the waveform of FIG. 7(c) above 0 volts being flipped over so that the +5 volts portions of waveform in FIG. 7(c) becomes 0 volts in FIG. 7(d) and 0 volts becomes +5 volts.

FIG. 7(e) illustrates the waveform present at the output of the modulator 14 in response to the data signal of FIG. 7(c). The waveform of FIG. 7(e) is a double sideband modulated carrier, modulated in a linear modulator, with a phase as shown in FIG. 7(f). FIG. 7(g) illustrates the waveform appearing at the output of the modulator 22. FIG. 7(g) is a double sideband version of the waveform shown in FIG. 7(d). Because the amplitude of the modulating signal 7(d) does not go negative the phase of the output signal from modulator 22 will always be 90°. This phase relationship is shown in FIG. 7(h). FIG. 7(i) illustrates the output signal from the combiner 24. Combiner 24 algebraically sums the signals of FIG. 7(e) and 7(g). The phase of the signal shown in 7(i) is shown in FIG. 7(j). The phasing signal of FIG. 7(j) illustrates a smooth transition in the phase change. The output signal from the combiner 24 is fed to the limiter 26 wherein the signal is amplitude limited so as to remove the amplitude dips shown in FIG. 7(i) so as to provide the signal shown in FIG. 7(k). The phase of the signal shown in 7(k) is the same as the phase shown in FIG. 7(j).

In the preferred embodiment of the invention the phase modulators may be of the type manufactured by MiniCircuits Laboratory, a division of Scientific Components Corporation and sold as the TAK series of double balanced mixers. The resistors 52 and 53 are 100 ohms and 6,800 ohms respectively. The zener diodes 54 and 55 are IN748 A's and the general purpose diodes 57 and 58 are IN4148's.

While there has been shown what is considered to be the preferred embodiment of the invention, it will be manifest that many changes and modifications may be made therein without departing from the essential spirit of the invention. It is intended therefore, in the annexed claims, to cover all such changes and modifications as fall within the true scope of the invention.

What is claimed is:

1. Apparatus for modulating a carrier signal with a digital data signal comprising in combination:
    filter means for receiving and filtering a digital data signal;
    carrier generator means for providing a first and a second carrier signal in phase quadrature with each other;
    a first modulator connected to said filter means and to said carrier generator means for modulating said first carrier signal as a function of the filtered digital data signal from said filter means;
    a second modulator connected to said carrier generator means for modulating said second carrier signal as a function of a control signal;
    circuit means connected to said filter means for providing said control signal, which control signal adjusts the amplitude of the second carrier signal to complement the amplitude of the modulated first carrier signal;
    a signal combiner connected to said first and to said second modulators for combining the modulated carrier signals from said first and said second modulators; and
    amplitude limiting means connected to said signal combiner for limiting the amplitude variations in the combined modulated carrier signal.

2. The apparatus according to claim 1 wherein said first and said second modulators are phase modulators.

3. The apparatus according to claim 1 and further comprising:
    amplifier means connected to intercept the digital data signal prior to receipt of said signal by said filter means for converting the digital data signal into a signal having positive and negative amplitudes.

4. The apparatus according to claim 1 and further comprising:
    a first linearizing circuit interposed between said filter means and said first modulator for linearizing the modulations of said first modulator; and
    a second linearizing circuit interposed between said circuit means and said second modulator for linearizing the modulations of said second modulator.

5. Apparatus for phase modulating a carrier signal with a digital data signal comprising in combination:
    filter means for receiving and filtering a digital data signal to provide a filtered digital data signal;
    carrier signal generator means for providing a first and a second carrier signal in phase quadrature with each other;
    means for phase modulating said first carrier signal with said filtered digital data signal;
    means for modulating said second carrier signal with said filtered digital data signal only during data transitions of said filtered digital data signal so as to provide a modulated second carrier signal which complements the modulated first carrier signal;
    a signal combiner connected to receive the modulated first and second carrier signals and for providing a combined modulated signal; and
    amplitude limiting means connected to receive said combined modulated signal for limiting the amplitude variations thereof.

6. The apparatus according to claim 5 and further comprising:
    a first linearizing circuit connected to said means for phase modulating for linearizing said means for phase modulating; and
    a second linearizing circuit connected to said means for modulating for linearizing said means for modulating.

7. The apparatus according to claim 5 wherein said filter means is a low pass filter.

8. The apparatus according to claim 5 wherein said first and said second carrier signals are RF carrier signals.

9. Apparatus for modulating a carrier signal with a digital data signal comprising in combination:
carrier signal generator means for providing a first and a second carrier signal in phase quadrature with each other;
first channel means for modulating said first carrier signal as a function of said digital data signal;
a second channel means including combining means for modulating said second carrier signal with said digital data signal only during data transitions of said digital data signal so as to provide a modulated second carrier signal which complements the modulated first carrier signal, and for combining the modulated first and second carrier signals; and
limiting means for limiting the amplitude variations in the combined modulated signals.

10. The apparatus according to claim 9 and further comprising:
means for premodulation filtering and digital data signal so as to slow the data transitions of said signal.

* * * * *

UNITED STATES PATENT OFFICE
CERTIFICATE OF CORRECTION

Patent No. 3,973,201    Dated August 3, 1976

Inventor(s) Carl F. Andren

It is certified that error appears in the above-identified patent and that said Letters Patent are hereby corrected as shown below:

Column 8, line 8, "and" should be --said--.

Signed and Sealed this

Third Day of May 1977

[SEAL]

Attest:

RUTH C. MASON
*Attesting Officer*

C. MARSHALL DANN
*Commissioner of Patents and Trademarks*